(12) United States Patent
Uchimura et al.

(10) Patent No.: US 8,897,290 B2
(45) Date of Patent: Nov. 25, 2014

(54) INFORMATION PROCESSING DEVICE AND MOBILE TERMINAL

(75) Inventors: Yutaka Uchimura, Kanagawa (JP); Takahiro Irita, Kanagawa (JP); Jiro Hara, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 573 days.

(21) Appl. No.: 13/286,205

(22) Filed: Oct. 31, 2011

(65) Prior Publication Data

US 2012/0109644 A1     May 3, 2012

(30) Foreign Application Priority Data

Nov. 2, 2010    (JP) ................................. 2010-246282

(51) Int. Cl.
     *H04L 29/06*        (2006.01)
     *G10L 19/16*        (2013.01)

(52) U.S. Cl.
     CPC ............... *G10L 19/16* (2013.01); *H04L 29/06* (2013.01)
     USPC ........... 370/352; 370/353; 370/390; 370/389; 379/93.01; 379/114.01; 379/90.01; 704/270.1; 704/275; 704/201

(58) Field of Classification Search
     CPC ... H04L 29/06; H04L 29/06027; H04L 12/66; H04K 999/99; H04B 1/665; G10L 19/02; G10L 19/267; G10L 19/035; G10L 25/00; G10L 25/78; G10L 21/00
     USPC ............... 370/352, 353, 390, 389; 379/93.01, 379/114.01, 93.07, 90.01; 704/270.1, 275, 704/270, 201, 213
     See application file for complete search history.

(56) References Cited

U.S. PATENT DOCUMENTS

| | | | | |
|---|---|---|---|---|
| 5,371,540 | A | * | 12/1994 | Tamura et al. ............. 348/222.1 |
| 5,761,637 | A | * | 6/1998 | Chino ........................... 704/231 |
| 6,011,803 | A | * | 1/2000 | Bicknell et al. ............... 370/467 |
| 6,011,899 | A | | 1/2000 | Ohishi et al. |
| 6,909,708 | B1 | * | 6/2005 | Krishnaswamy et al. ..... 370/352 |
| 2009/0109959 | A1 | * | 4/2009 | Elliott et al. .................. 370/352 |

FOREIGN PATENT DOCUMENTS

| | | |
|---|---|---|
| JP | 9-186665 A | 7/1997 |
| JP | 2006-114988 A | 4/2006 |
| JP | 2007-150809 A | 6/2007 |
| JP | 2007-181006 A | 7/2007 |

OTHER PUBLICATIONS

Office Action dated May 1, 2014, in Japanese Patent Application No. 2010-246282.

* cited by examiner

*Primary Examiner* — Vijay B Chawan
(74) *Attorney, Agent, or Firm* — Miles & Stockbridge P.C.

(57) ABSTRACT

There is a need to enable decompression of a speech signal even if no network synchronizing signal is output from a baseband processing portion. For this purpose, an information processing device includes a first serial interface. The first serial interface includes a notification signal generation circuit that generates a notification signal each time compressed data incorporated from the baseband processing portion reaches a predetermined data quantity, and notifies a speech processing portion of this state using the notification signal. The speech processing portion includes a synchronizing signal generation circuit that generates a network synchronizing signal based on the notification signal. A clock signal for PCM communication is generated based on the network synchronizing signal. A speech signal can be decompressed even if no network synchronizing signal is output from the baseband processing portion.

7 Claims, 10 Drawing Sheets

INFORMATION PROCESSING DEVICE AND MOBILE TERMINAL

CROSS-REFERENCE TO RELATED APPLICATIONS

The disclosure of Japanese Patent Application No. 2010-246282 filed on Nov. 2, 2010 including the specification, drawings and abstract is incorporated herein by reference in its entirety.

BACKGROUND

The present invention relates to an information processing technology, an information processing device for information processing, and a mobile terminal including the same.

Patent document 1 describes an information reproducing unit that reproduces image and sound data using image and sound data characteristics with low power consumption. The information reproducing unit controls frequencies of a sound reproduction clock for sound data sampling based on a count clock that is controlled using time information included in a received broadcast signal.

Patent document 2 describes a receiving terminal unit for receiving transmitted digital broadcast packet data and a packet data recording unit for recording received packet data on a tape recording medium. The receiving terminal unit detects a PCR identification flag from input packets, extracts the PCR from a packet having the PCR identification flag, supplies the PCR to a 27-MHz phase-locked loop (PLL) circuit, and generates a 27-MHz synchronization signal whose time reference corresponds to the frequency of a system clock during encoding.

Patent Document 1: Japanese Unexamined Patent Application No. 2007-150809
Patent Document 2: Japanese Unexamined Patent Application No. 09 (1997)-186665

SUMMARY

A mobile terminal having the speech communication function includes a speech processing portion for speech signal processing, a baseband processing portion for baseband signal processing, an RF (radio frequency) portion for transmission/reception using radio frequencies, and a microcomputer for various types of information processing. The speech processing portion, the baseband processing portion, and the microcomputer are provided as LSI (Large Scale Integration) circuits and are mounted on a component mounting substrate. The speech processing portion and the baseband processing portion exchange a speech signal based on the PCM (Pulse Code Modulation) format. The speech signal is sent from the speech processing portion, compressed in the baseband processing portion, sent to the RF portion, and then transmitted to a network. A signal is received in the RF portion from the network, decompressed in the baseband processing portion, and then sent to the speech processing portion.

As mentioned above, a speech signal is exchanged between the speech processing portion and the baseband processing portion. In addition, a microcomputer is provided between the speech processing portion and the baseband processing portion and compresses and decompresses PCM signals as described above. In this case, the baseband processing portion does not need to compress and decompress PCM signals. The circuit scale can be reduced. The inventors found the following problems in the method of using the computer to compress and decompress PCM signals.

The baseband processing portion operates at a clock (e.g., 13 MHz) synchronized with the network. Therefore, the baseband processing portion necessarily compresses and decompresses PCM signals in synchronization with the network. However, the microcomputer operates at a clock asynchronous with the network. The baseband processing portion needs to supply the microcomputer with a 20-ms synchronizing signal and correct the clock signal in the microcomputer using the synchronizing signal when the microcomputer compresses and decompresses PCM signals. When compressing and decompressing PCM signals, the microcomputer can be combined with only a baseband processing portion that outputs the network synchronizing signal to the outside.

It is an object of the invention to provide an information processing device capable of decompressing speech signals and a mobile terminal including the information processing device even if a baseband processing portion does not output a network synchronizing signal.

These and other objects and novel features of the invention may be readily ascertained by referring to the following description and appended drawings.

The following summarizes representative aspects of the invention disclosed in this application.

The information processing device includes: a first terminal capable of coupling with a baseband processing portion; a second terminal capable of coupling with an audio processing portion; and a first serial interface capable of exchanging compressed data with the baseband processing portion coupled through the first terminal. The information processing device also includes: a speech processing portion capable of processing a speech signal incorporated by the first serial interface; a clock generator that generates a clock signal for PCM communication; and a second serial interface that uses a clock signal generated from the clock generator to enable PCM communication between the audio processing portion coupled through the second terminal and the speech processing portion. The first serial interface includes a notification signal generation circuit that generates a notification signal each time data incorporated from the baseband processing portion reaches a predetermined data quantity, and notifies the speech processing portion of this state using the notification signal. The speech processing portion includes a synchronizing signal generation circuit that generates a network synchronizing signal based on the notification signal. The clock generator generates the clock signal for PCM communication based on the network synchronizing signal generated from the synchronizing signal generation circuit.

The following summarizes an effect provided by the representative aspects of the invention disclosed in this application.

It is possible to provide an information processing device capable of decompressing speech signals and a mobile terminal including the information processing device even if a baseband processing portion does not output a network synchronizing signal.

DETAILED DESCRIPTION

1. Summary of the Embodiments

Figure 1:
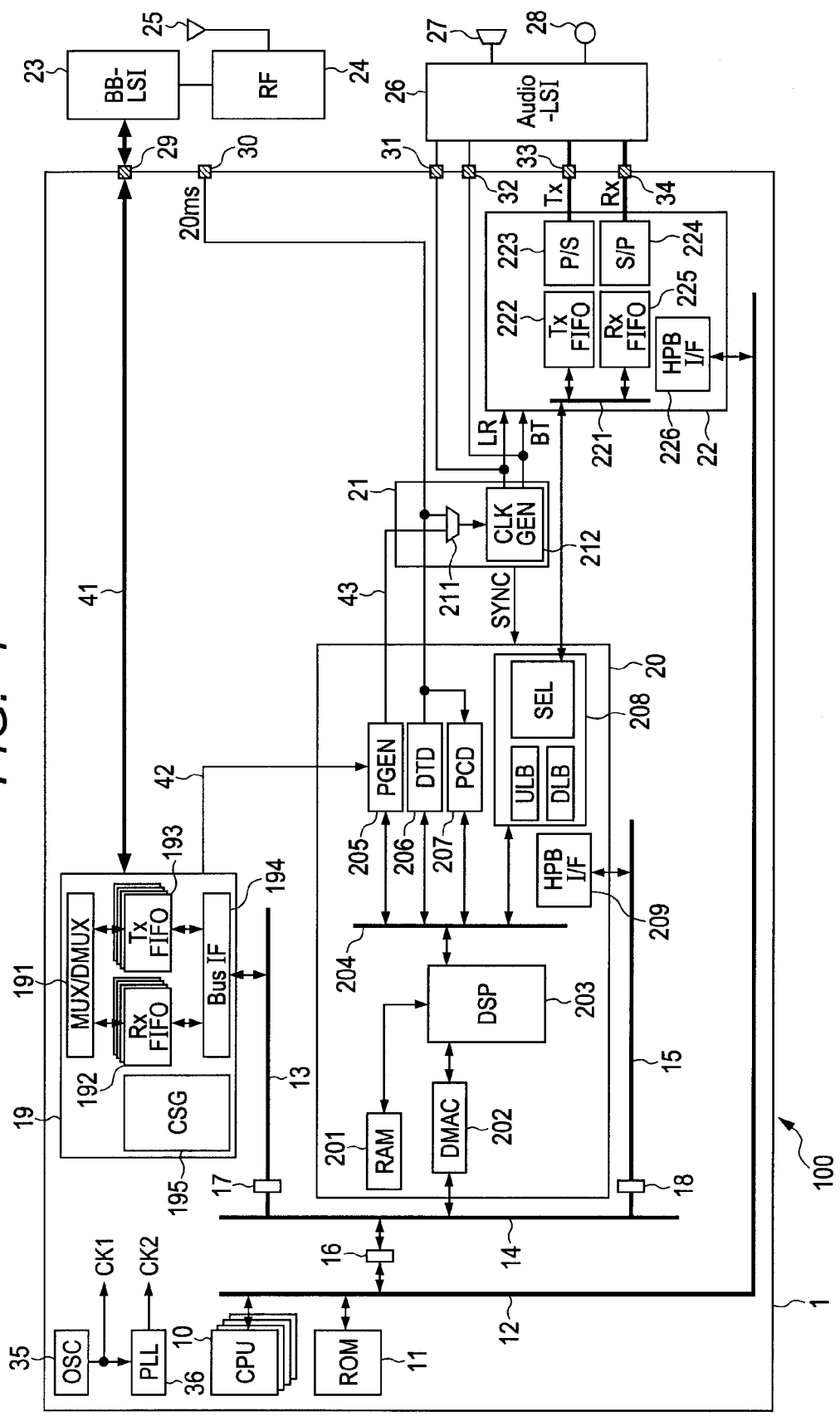
FIG. 1 is a block diagram showing a configuration example of a mobile terminal having a microcomputer as an example of the information processing device according to the invention.

The following summarizes representative embodiments of the invention disclosed in this specification. In the following description, parenthesized reference numerals correspond to those shown in the appended drawings and just denote examples belonging to the concept of the corresponding components.

[1] An information processing device (1) according to a representative embodiment of the invention includes: a first terminal (29, 30) capable of coupling with a baseband processing portion (23); a second terminal (31 to 34) capable of coupling with an audio processing portion (26); a first serial interface (19) capable of exchanging compressed data with the baseband processing portion coupled through the first terminal. The information processing device (1) also includes: a speech processing portion (20) capable of processing a speech signal incorporated by the first serial interface; a clock generator (21) that generates a clock signal for PCM communication; and a second serial interface (22) that uses a clock signal generated from the clock generator to enable PCM communication between the audio processing portion coupled through the second terminal and the speech processing portion. The first serial interface includes a notification signal generation circuit (195) that generates a notification signal each time data incorporated from the baseband processing portion reaches a predetermined data quantity, and notifies the speech processing portion of this state using the notification signal. The speech processing portion includes a synchronizing signal generation circuit (205) that generates a network synchronizing signal based on the notification signal. The clock generator generates the clock signal for PCM communication based on the network synchronizing signal generated from the synchronizing signal generation circuit.

According to the above-mentioned configuration, the notification signal generation circuit generates a notification signal each time compressed data incorporated from the baseband processing portion reaches a predetermined data quantity, and notifies the speech processing portion of this state using the notification signal. The synchronizing signal generation circuit generates a network synchronizing signal based on the notification signal. The information processing device can independently generate a network synchronizing signal based on compressed data incorporated from the baseband processing portion. A speech signal can be decompressed even if no network synchronizing signal is output from the baseband processing portion. To compress and decompress speech signals, the information processing device can be combined with a baseband processing portion other than that which outputs the network synchronizing signal to the outside. That is, the system can be configured by combining the information processing device with even a baseband processing portion that does not output the network synchronizing signal to the outside.

[2] According to aspect [1] above, the first serial interface may include: a buffer (192) capable of outputting an incorporated signal based on a first-in first-out method; and a pointer (1953) indicating a write position in the buffer. The notification signal generation circuit may include: a first threshold value register (1951) capable of setting a specified threshold value; and a first comparator (1952) that asserts the notification signal when a write position indicated by the pointer reaches a setting value in the first threshold value register.

[3] According to aspect [2] above, the synchronizing signal generation circuit may include: a counter (2051) that counts a specified clock signal and is reset by the notification signal; a second threshold value register (2053) capable of setting an upper limit and a lower limit; and a second comparator (2052) that determines whether a count value of the counter ranges between the upper limit and the lower limit of the second threshold value register. The synchronizing signal generation circuit may also include: a pulse information register (2055) that is supplied with pulse information based on a determination result from the second comparator; and a pulse generator logic (2054) that generates the network synchronizing signal at a frequency corresponding to a setting value for the pulse information register.

[4] According to aspect [3] above, the speech processing portion may include a signal processing circuit (203) that thins out a sample or embeds silence data when a count value in the counter does not range between an upper limit and a lower limit of the second threshold value register.

[5] According to aspect [4] above, the clock generator may include: a selector (211) that can select the network synchronizing signal output from the pulse generator logic and a synchronizing signal output from the baseband processing portion; and a clock generation circuit (212) that generates a synchronizing signal used for speech signal communication.

[6] According to aspect [5] above, the first terminal may include a third terminal (30) for incorporating the synchronizing signal from the baseband processing portion. The information processing device may include a switch (90) capable of coupling the third terminal to a circuit other than the clock generator when the synchronizing signal is not incorporated from the baseband processing portion through the third terminal.

[7] A mobile terminal may include: the information processing device according to aspect [5] above; a baseband processing portion coupled to the information processing device; and an audio processing portion coupled to the information processing device.

2. Details of the Embodiments

The following describes the embodiment in more detail.

First Embodiment

FIG. 1 shows a mobile terminal having a microcomputer as an example of the information processing device according to the invention.

A mobile terminal 100 shown in FIG. 1 includes a microcomputer 1, a baseband LSI (BB-LSI) 23, an RF (Radio Frequency) circuit 24, an Audio-LSI 26, a speaker 27, and a microphone 28. The microcomputer 1, the baseband LSI 23, the RF circuit 24, and the audio LSI 26 are formed over a single semiconductor substrate using, for example, single-crystal silicon according to a known semiconductor integrated circuit manufacturing technology.

The microcomputer 1 performs various types of information processes in accordance with a predetermined program. The information processes include a process of compressing PCM signals (PCM data) sent from the audio LSI 26 and a process of decompressing compressed data 41 sent from the baseband LSI 23. The decompression process for the compressed data 41 is equivalent to a process of decoding the compressed data 41 and converting it into speech data. The microcomputer 1 also provides overall control of the information processing device. The microcomputer 1 is provided with terminals 29, 30, 31, 32, 33, and 34. The terminal 29 is coupled to the baseband LSI 23. The microcomputer 1 and the baseband LSI 23 exchange the compressed data 41 through the terminal 29. The terminals 31 through 34 are coupled to the audio LSI 26. The microcomputer 1 and the audio LSI 26 exchange speech signals through the terminals 31 through 34. The terminal 30 is opened in this example.

The baseband LSI 23 performs a baseband process. The baseband process includes a process of attaching a signal other than an information source (e.g., speech data) during transmission and a process of separating the information source from the other signals during reception. Signals other than the information source include information for specifying communication destinations, words for timing synchronization between transmission and reception parties, error control codes, and frame length information.

The RF circuit 24 performs transmission and reception processes based on radio frequencies through an antenna 25. The baseband LSI 23 sends baseband process information to the RF circuit 24. The RF circuit 24 transmits the baseband process information to the network. The RF circuit 24 receives a signal from the network and sends the signal to the baseband processing portion 23.

The audio LSI 126 includes a function of converting a speech signal input through the microphone 28 into a PCM code and outputting it to the microcomputer 1 and a function of driving the speaker 27 in accordance with the PCM code sent from the microcomputer 1.

The configuration of the microcomputer 1 will be described in detail.

The microcomputer 1 includes a central processing unit (CPU) 10, ROM (Read Only Memory) 11, a first serial interface 19, a speech processing portion 20, a clock generator 21, a second serial interface 22, an oscillator (OSC) 35, and a PLL (Phase Locked Loop) 36, for example.

The oscillator 35 generates a first clock signal CK1 at a specified frequency using a crystal oscillator. The PLL 36 outputs a second clock signal CK2 synchronized with the first clock signal CK1 output from the oscillator 35. The second clock signal CK2 is supplied as an operation clock to the components.

The central processing unit 10 is coupled to the ROM 11 through a bus 12. The ROM 11 stores a program performed by the central processing unit 10. The central processing unit performs the program stored in the ROM 11 to control operations for the components. The bus 12 is coupled to a bus 14 via a bus bridge 16. The bus 14 is coupled to a bus 13 via a bus bridge 17 and is coupled to a bus 15 via a bus bridge 18. The bus 13 is coupled to the first serial interface 19. The buses 14 and 15 are coupled to the speech processing portion 20.

The first serial interface 19 performs serial data communication with the baseband LSI 23 through the terminal 29. The data communication exchanges the compressed data 41. The first serial interface 19 includes a multiplexer/demultiplexer (MUX/DMUX) portion 191, a reception buffer (Rx FIFO) 192, a transmission buffer (Tx FIFO) 193, a bus interface (Bus IF) 194, and a notification signal generation circuit 195. The reception buffer 192 and the transmission buffer 193 are configured as FIFO buffers. The multiplexer/demultiplexer portion 191 is coupled to the baseband LSI 23 through the terminal 29. The bus interface 194 is coupled to the bus 13. The compressed data 41 sent from the baseband LSI 23 is sequentially stored in the reception buffer 192 via the multiplexer/demultiplexer portion 191. The compressed data stored in the reception buffer 192 is output to the bus 13 via the bus interface 194. Compressed data received from the bus 13 via the bus interface 194 is sequentially stored in the transmission buffer 193. The compressed data stored in the transmission buffer 193 is output to the baseband LSI 23 via the multiplexer/demultiplexer portion 191. The notification signal generation circuit 195 asserts a notification signal 42 each time the compressed data stored in the reception buffer 192 reaches a predetermined data quantity. The notification signal 42 is generated to notify this state.

The speech processing portion 20 includes RAM 201, a DMAC (Direct Memory Access Controller) 202, a DSP (Digital Signal Processor) 203, a pulse generator (PGEN) 205, a DSP control portion (DTD) 206, a pulse detection portion 207, a buffer portion 208, and an HPB interface 209. The DSP 203 compresses data (encoding) to be transmitted and decompresses the compressed data 41 (decoding) sent from the baseband LSI 23. The RAM 201 stores data compressed or decompressed by the DSP 203 included in the speech processing portion 20. The DMAC 202 transfers data between the first serial interface 19 and the RAM 201 without intermediation of the central processing unit 10. The pulse generator 205, the DSP control portion 206, the pulse detection portion 207, and the buffer portion 208 are coupled to the DSP 203 via a bus 204. The speech processing portion 20 is coupled to the audio LSI 2.6 via the second serial interface 22.

The buffer portion 208 includes an upload buffer (ULB), a download buffer (DLB), and a selector (SEL). The selector (SEL) selectively couples the upload buffer (ULB) and the download buffer (DLB) to the second serial interface 22. The upload buffer (ULB) buffers PCM data sent from the second serial interface 22. The download buffer (DLB) buffers PCM data, that is, data decompressed in the DSP 203. The download buffer (DLB) outputs the decompressed data (PCM data) to the externally coupled audio LSI via the second serial interface 22. The audio LSI reproduces the PCM data and generates sound from the speaker 27.

The pulse generator 205 generates a 20-ms network synchronizing signal 43 based on the notification signal 42 from the notification signal generation circuit 195. The network synchronizing signal 43 is sent to the clock generator 21. The notification signal generation circuit 195 might assert the notification signal 42 at a timing that greatly differs from the reference in accordance with a change of the base station communicating with the mobile terminal. In such a case, the network synchronizing signal 43 is generated at an incorrect frequency. The download buffer (DLB) might store too large or small an amount of decompressed data. In other words, the download buffer outputs too large or small an amount of decompressed data (PCM data or samples) to the audio LSI. The speaker 27 might generate unpleasant sound. To solve the problem, a handover process is performed. The pulse generator 205 determines whether the notification signal generation circuit 195 asserts the notification signal 42 at a timing greatly different from the reference. If the notification signal 42 is asserted at a timing greatly different from the reference, the DSP 203 retries the synchronization and thins out decompressed data (PCM data or samples) or embeds silence data. Samples are thinned out if too many samples are available. Silence data is embedded if too few samples are available. In this manner, the handover process prevents the speaker 27 from generating unpleasant sound.

The baseband LSI 23 might input a network synchronizing signal through the terminal 30. In this example, the handover process is also performed when the baseband LSI 23 inputs a network synchronizing signal through the terminal 30. In this case, the DSP control portion 206 controls the decompression process in the DSP 203. The pulse detection portion 207 monitors a network synchronizing signal from the baseband LSI 23 through the terminal 30. If the network synchronizing signal timing greatly differs from the reference, the DSP control portion 206 allows the DSP 203 to thin out samples or embed silence data during the decompression process. The handover process prevents the speaker 27 from generating unpleasant sound.

The HPB interface 209 supplies information setting from the central processing unit 10 to registers for various settings in the speech processing portion 20.

The clock generator 21 includes a selector 211 and a clock generation circuit (CLK GEN) 212. The selector 211 selectively sends the network synchronizing signal 43 from the pulse generator 205 and the network synchronizing signal sent from the baseband LSI 23 through the terminal 30 to the clock generation circuit 212. A user can determine the selection state of the selector 211 using settings of a register (not shown). If a network synchronizing signal can be incorporated from the baseband LSI 23 through the terminal 30, the selector 211 may be configured to selectively send the network synchronizing signal sent through the terminal 30 and the network synchronizing signal 43 from the pulse generator 205 to the clock generation circuit 212. The clock generation circuit 212 generates a clock signal used for the PCM communication and a synchronizing signal SYNC for data transfer based on the network synchronizing signal sent through the selector 211. The clock signal used for the PCM communication contains an 8-KHz synchronizing signal (LR) and a bit clock signal (Bit). The bit clock signal provides sampling frequencies of 32, 64, 128, 256, and 512 fs. The synchronizing signal (Sync) and the bit clock signal (Bit) are sent to the second serial interface 22 and are sent to the audio LSI 26 through the terminals 31 and 32. The synchronizing signal SYNC for data transfer is sent to the speech processing portion 20.

The second serial interface 22 includes a transmission buffer (Tx FIFO) 222, a parallel-serial conversion circuit 223, a serial-parallel conversion circuit 224, a reception buffer (Rx FIFO) 225, and an HPB interface (HPB I/F) 226. The second serial interface 22 exchanges serial data with the audio LSI 26 in synchronization with the 8-KHz synchronizing signal (Sync) and the bit clock signal (Bit) generated from the clock generator 21. Data is transferred between the second serial interface 22 and the buffer portion 208 in the speech processing portion 20 in synchronization with the synchronizing signal SYNC for data transfer. The second serial interface 22 converts data sent from the speech processing portion 20 into the PCM protocol and outputs it to the audio LSI 26. The second serial interface 22 converts PCM data sent from the audio LSI 26 into parallel data and outputs it to the speech processing portion 20. The transmission buffer 222 and the reception buffer 225 are coupled to the buffer portion 208 in the speech processing portion 20 through a bus 221. The transmission buffer 222 and the reception buffer 225 are configured as FIFO buffers. The parallel-serial conversion circuit 223 converts parallel data sent via the transmission buffer 222 into serial data. The serial data is sent to the audio LSI 26 through a terminal 33. The serial-parallel conversion circuit 224 converts serial data sent from the audio LSI 26 into parallel data. The parallel data is sent to the speech processing portion 20 through the reception buffer 225. The HPB interface 226 supplies information setting from the central processing unit 10 to registers for various settings in the second serial interface 22.

According to the above-mentioned configuration, the compressed data 41 sent from the baseband LSI 23 is incorporated into the reception buffer 192 in the first serial interface 19. The speech processing portion 20 is notified that the compressed data is stored in the reception buffer 192. The DMAC 202 then transfers the data in the reception buffer 192 to the RAM 201. The DSP 203 decompresses the compressed data in the RAM 201. The decompressed data is sent to the second serial interface 22 through the download buffer (DLB) in the buffer portion 208. The data is converted into PCM data and is sent to the audio LSI 26 to drive the speaker 27. Speech data input from microphone 28 is sent from the audio LSI 26 to the second serial interface 22. The data is converted into parallel data in the second serial interface 22 and is sent to the upload buffer (ULB) in the buffer portion 208. The data in the upload buffer (ULB) is compressed in the DSP 203 and is stored in the RAM 201. The DMAC 202 transfers the compressed data stored in the RAM 201 to the transmission buffer 193 in the first serial interface 19. The compressed data transferred to the transmission buffer 193 in the first serial interface 19 is sent to the baseband LSI 23 through the terminal 29. The RF circuit 24 transmits the compressed data to the network.

Figure 2:
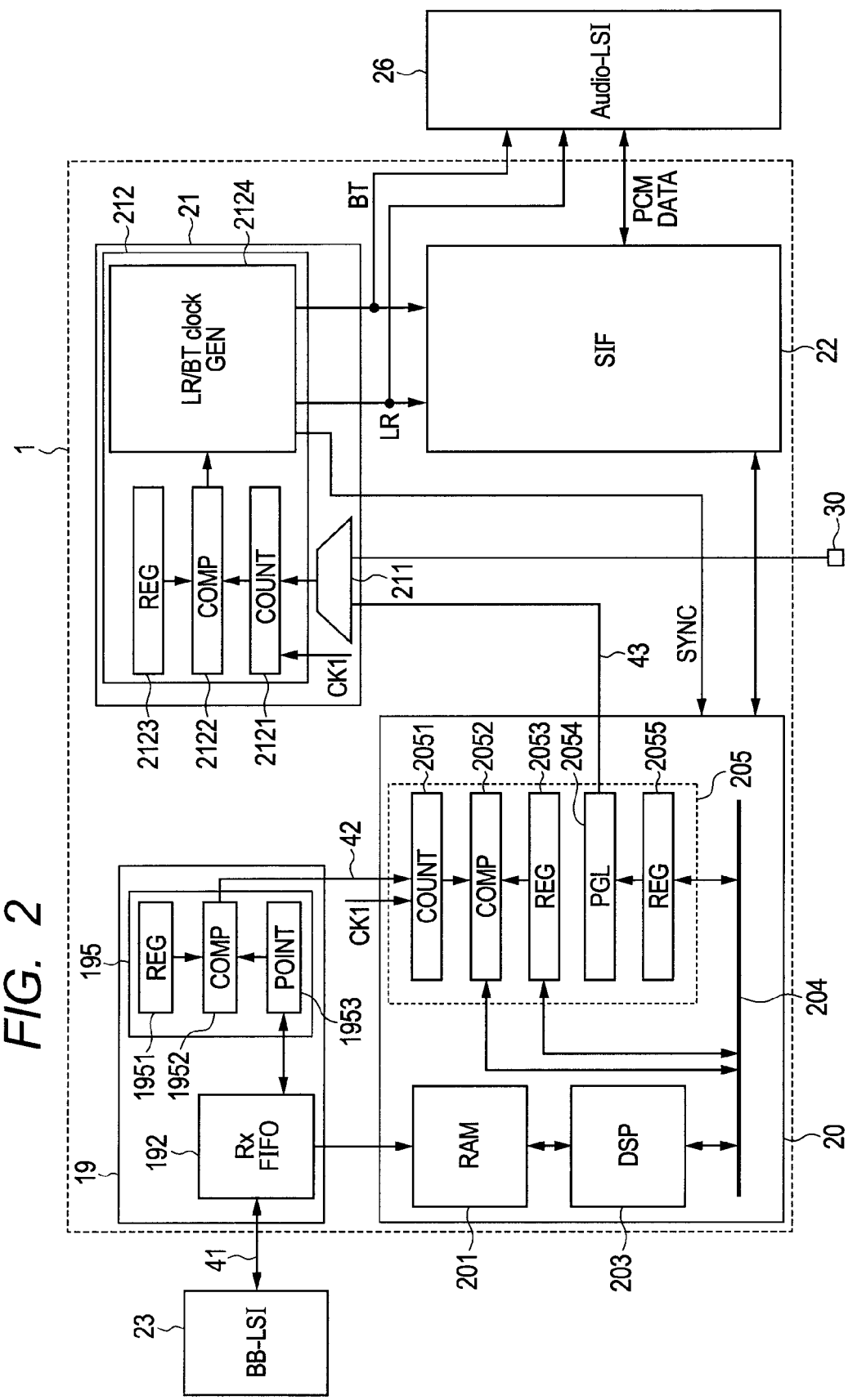
FIG. 2 is a block diagram showing a configuration example of major components of the microcomputer shown in FIG. 1.

FIG. 2 shows a configuration example of major components of the microcomputer 1 shown in FIG. 1.

The notification signal generation circuit 195 in the first serial interface 19 includes a register (REG) 1951, a comparator (COMP) 1952, and a pointer (POINT) 1953. The pointer 1953 indicates the current write position in the reception buffer 192. The position indicated by the pointer 1953 depends on the amount of data stored in the reception buffer 192. The register 1951 maintains a specified threshold value supplied from the central processing unit 10. The comparator 1952 asserts the notification signal 42 to the speech processing portion 20 when an output value from the pointer 1953 reaches the threshold value placed in the register 1951. The base station transmits packets (compressed data) at a predetermined timing. If the base station transmits packets at a 20-ms cycle, for example, the threshold value for the register 1951 is specified so as to assert the notification signal 42 when 52-byte compressed data is received. Accordingly, the notification signal 42 is asserted each time 52-byte compressed data is received from the base station.

The pulse generator 205 in the speech processing portion 20 includes a counter (COUNT) 2051, a comparator (COMP) 2052, a register (REG) 2053, a pulse generator logic (PGL) 2054, and a register (REG) 2055. The counter 2051 counts a clock signal CK1 output from the oscillator 35. The counter 2051 is reset each time the notification signal 42 is asserted. The DSP 203 supplies two threshold values, an upper threshold value and a lower threshold value, to the register 2052. The comparator 2052 is provided as a so-called window comparator and determines whether a count output value from the counter 2051 ranges between the upper and lower threshold values specified in the register 2052. If the count output value from the counter 2051 ranges between the upper and lower threshold values specified in the register 2052, the DSP 203 supplies a value to the register 2055 based on an output value from the counter 2051 immediately before the reset. The pulse generator logic 2054 asserts the network synchronizing signal 43 at a cycle corresponding to the output value from the register 2055. That is, a variation in the timing to assert the notification signal 42 is assumed to be allowable if the count output value from the counter 2051 ranges between the upper and lower threshold values specified in the register 2052. The cycle of the network synchronizing signal 43 reflects the variation in the timing to assert the notification signal 42. On the other hand, a variation in the timing to assert the notification signal 42 is assumed to exceed the allowable range if the count output value from the counter 2051 does not range between the upper and lower threshold values specified in the register 2052. This means that the timing greatly deviates from the reference due to a change of the base station with which the mobile terminal communicates. In such a case, the DSP 203 supplies the register 2055 with a standard value for generating the 20-ms network synchronizing signal 43 in the mobile terminal 100 regardless of the output value from the counter 2051 immediately before the reset. The pulse generator logic 2054 asserts the network synchronizing signal 43 at a cycle corresponding to the output value from the register 2055. The cycle of the network synchronizing signal 43 can be prevented from varying undesirably even if the assertion timing of the notification signal 42 varies outside the allowable range.

The clock generation circuit 212 in the clock generator 21 includes a counter (CONT) 2121, a comparator (COMP) 2122, a register (REG) 2123, and an LR/BT clock generation portion (LR/BT clock GEN) 2124. The counter 2121 counts the clock signal CK1 output from the oscillator 35. The counter 2121 is reset each time an output (network synchronizing signal) from the selector 211 is asserted. The DSP 203 supplies two threshold values, an upper threshold value and a lower threshold value, to the register 2123. The comparator 2122 is provided as a so-called window comparator and determines whether a count output value from the counter 2121 ranges between the upper and lower threshold values specified in the register 2123. If the count output value from the counter 2121 ranges between the upper and lower threshold values specified in the register 2123, the LR/BT clock generation portion 2124 generates an 8-KHz synchronizing signal (LR), a bit clock signal (Bit), and a data transfer synchronizing signal (SYNC) in synchronization with an output (network synchronizing signal) from the selector 211. If the count output value from the counter 2121 does not range between the upper and lower threshold values specified in the register 2123, the LR/BT clock generation portion 2124 generates an 8-KHz synchronizing signal (LR), a bit clock signal (Bit), and a data transfer synchronizing signal (SYNC) asynchronously with an output (network synchronizing signal) from the selector 211.

Figure 3:
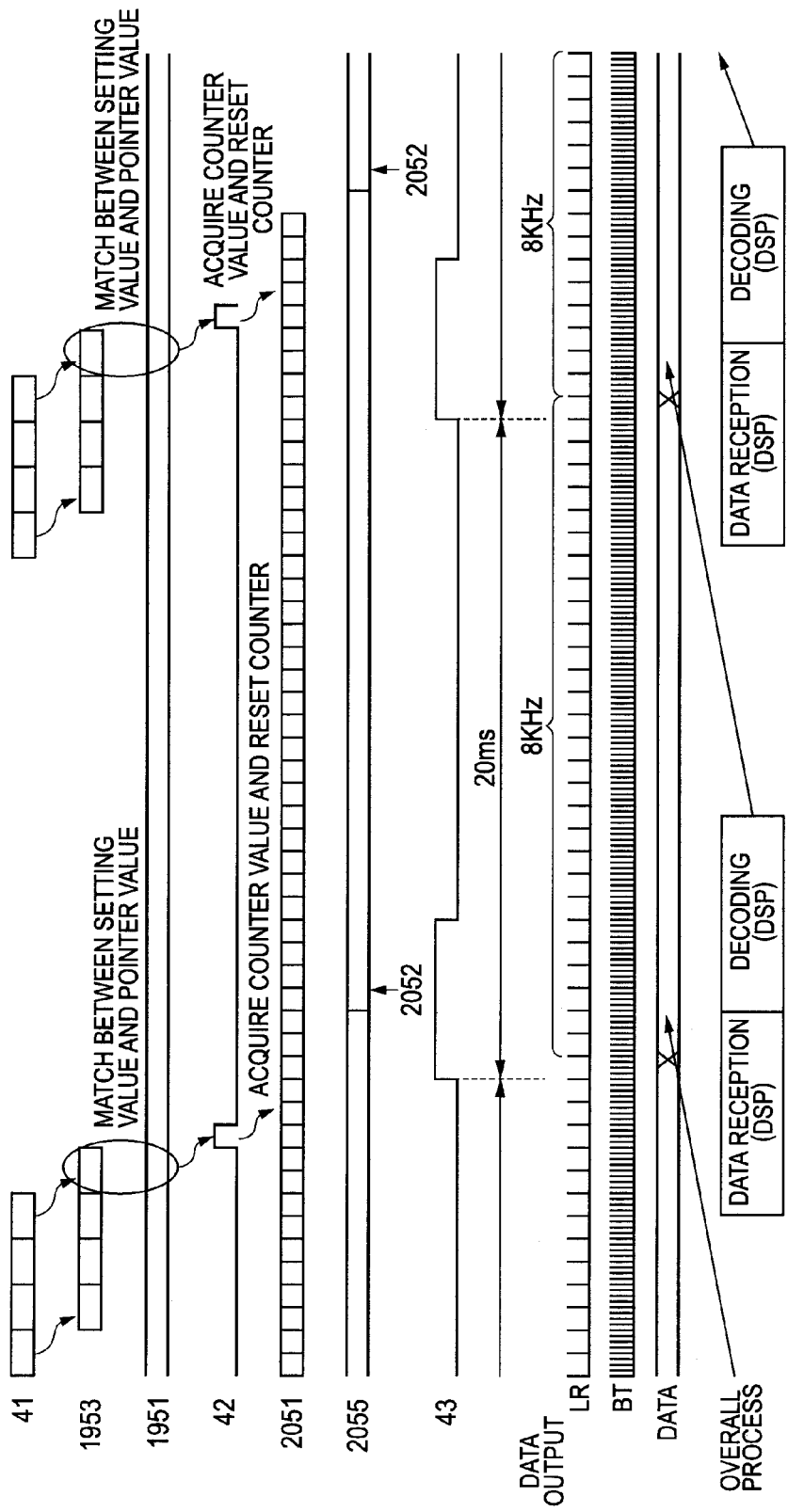
FIG. 3 is an operation timing chart for major components of the microcomputer shown in FIG. 1.
Figure 8:
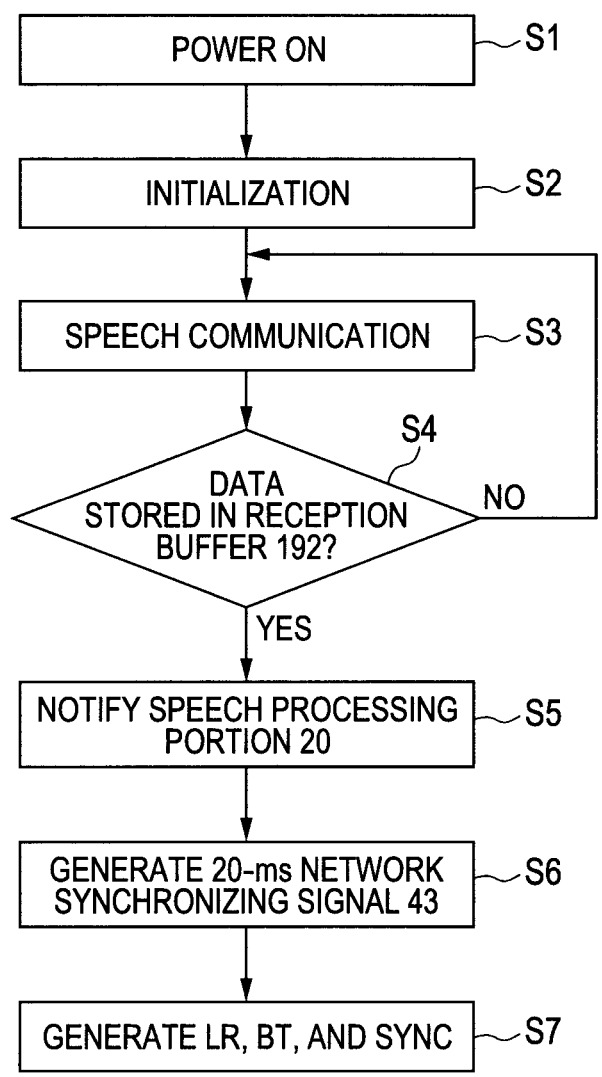
FIG. 8 is a flowchart showing basic operations of the mobile terminal shown in FIG. 1.

FIG. 8 shows basic operations of the mobile terminal 100 according to the above-mentioned configuration. FIG. 3 shows operation timings for the major components of the microcomputer 1 according to the above-mentioned configuration.

When the mobile terminal 100 is turned on (S1), the central processing unit 10 is reset to initialize the components (S2). The comparator 1952 in the first serial interface 19 determines whether data is stored in the reception buffer (Rx FIFO) 192, that is, whether an output value from the pointer 1953 reaches the threshold value specified for the register 1951 (S4). The notification signal 42 is asserted (S5) if the output value from the pointer 1953 reaches the threshold value specified for the register 1951. The counter 2051 in the speech processing portion 20 counts the clock signal CK1 output from the oscillator 35. The counter 2051 is reset each time the notification signal 42 is asserted. The DSP 203 supplies a value to the register 2055 based on the output value from the counter 2051 immediately before the reset if the count output value from the counter 2051 ranges between the upper and lower threshold values specified for the register 2052. The pulse generator logic 2054 asserts the network synchronizing signal 43 at a cycle corresponding to the output value from the register 2055. As a result, the network synchronizing signal 43 at the 20-ms cycle is generated (S6). The clock generation circuit 212 in the clock generator 21 generates an 8-KHz synchronizing signal (LR), a bit clock signal (Bit), and a data transfer synchronizing signal (SYNC) in synchronization with an output (network synchronizing signal) from the selector 211 (S7). The second serial interface 22 exchanges serial data with the audio LSI 26 in synchronization with the 8-KHz synchronizing signal (LR) and the bit clock signal (Bit) generated from the clock generator 21. The second serial interface 22 transfers data to the buffer portion 208 in the speech processing portion 20 in synchronization with the data transfer synchronizing signal SYNC.

Figure 4:
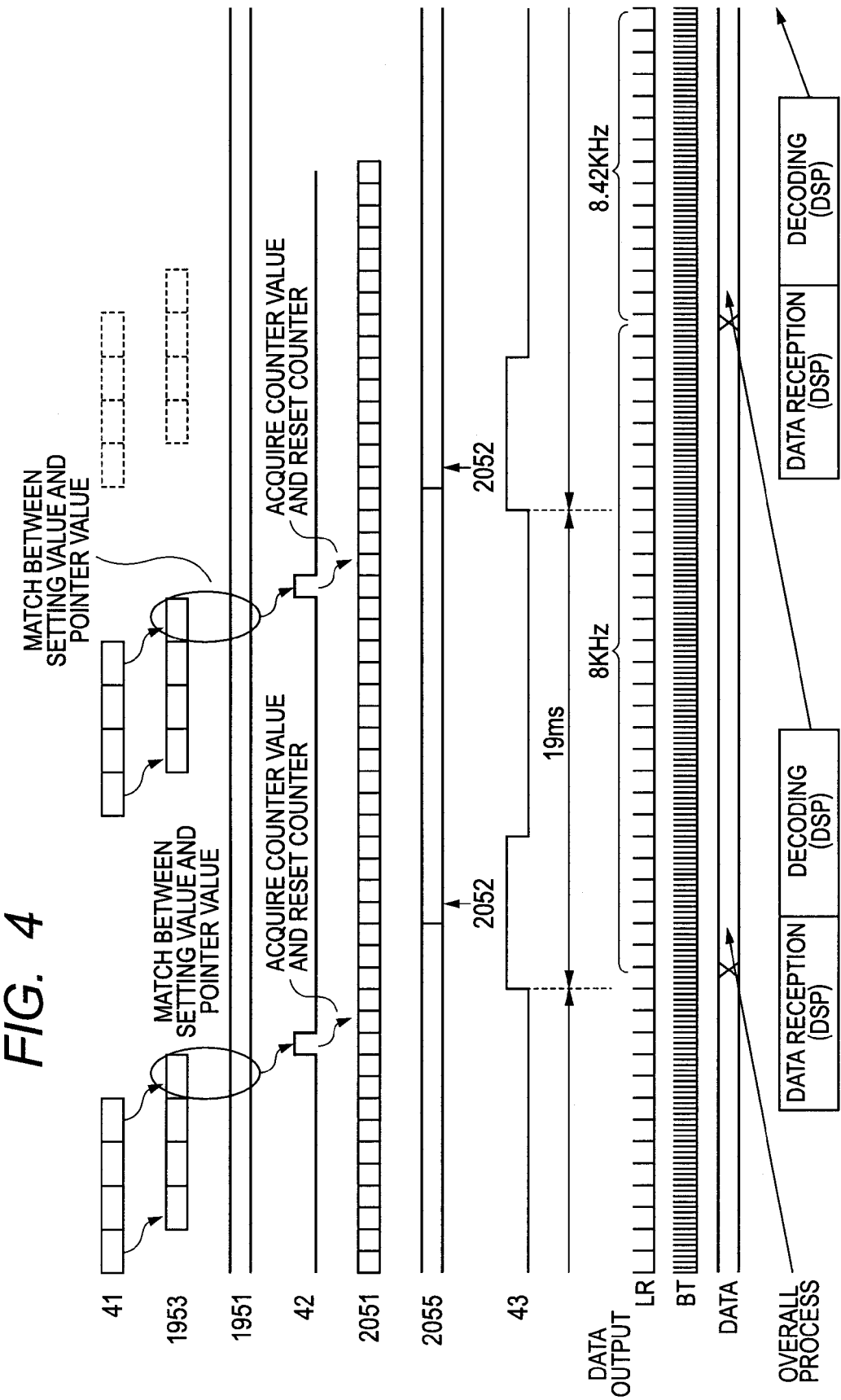
FIG. 4 is another operation timing chart for major components of the microcomputer shown in FIG. 1.

FIG. 4 shows operation timings when packets are received from the baseband LSI 23 through the terminal 29 at an interval slightly shorter than that shown in FIG. 3.

If packets are received from the baseband LSI 23 through the terminal 29 at a slightly shorter interval, the notification signal 42 is accordingly asserted at a shorter timing interval. The effect affects the cycle of the network synchronizing signal 43. The cycle of the network synchronizing signal 43 also becomes shorter. The cycle of the network synchronizing signal 43 is shown as 20 ms in the example of FIG. 3 and 19 ms in the example of FIG. 4. Changing the cycle of the network synchronizing signal 43 to 19 ms generates an 8.42-KHz synchronizing signal (LR). This causes no effect on the overall operation.

Figure 5:
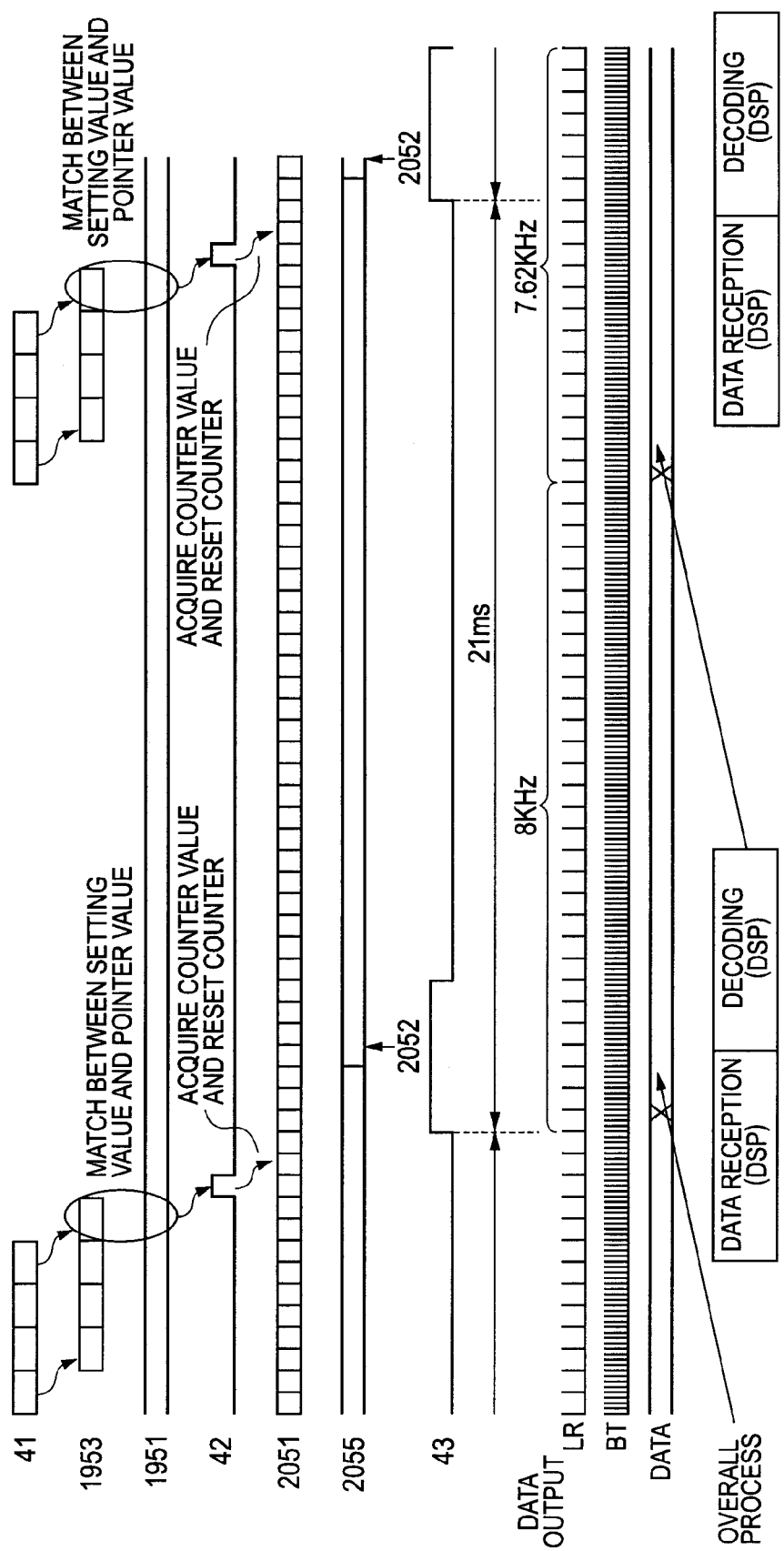
FIG. 5 is still another operation timing chart for major components of the microcomputer shown in FIG. 1.

FIG. 5 shows operation timings when packets are received from the baseband LSI 23 through the terminal 29 at a slightly longer interval.

If packets are received from the baseband LSI 23 through the terminal 29 at a slightly longer interval, the notification signal 42 is accordingly asserted at a longer timing interval. The effect affects the cycle of the network synchronizing signal 43. The cycle of the network synchronizing signal 43 also becomes longer. The cycle of the network synchronizing signal 43 is shown as 20 ms in the example of FIG. 3 and 21 ms in the example of FIG. 5. Changing the cycle of the network synchronizing signal 43 to 21 ms generates a 7.62-KHz synchronizing signal (LR). This causes no effect on the overall operation.

Figure 6:
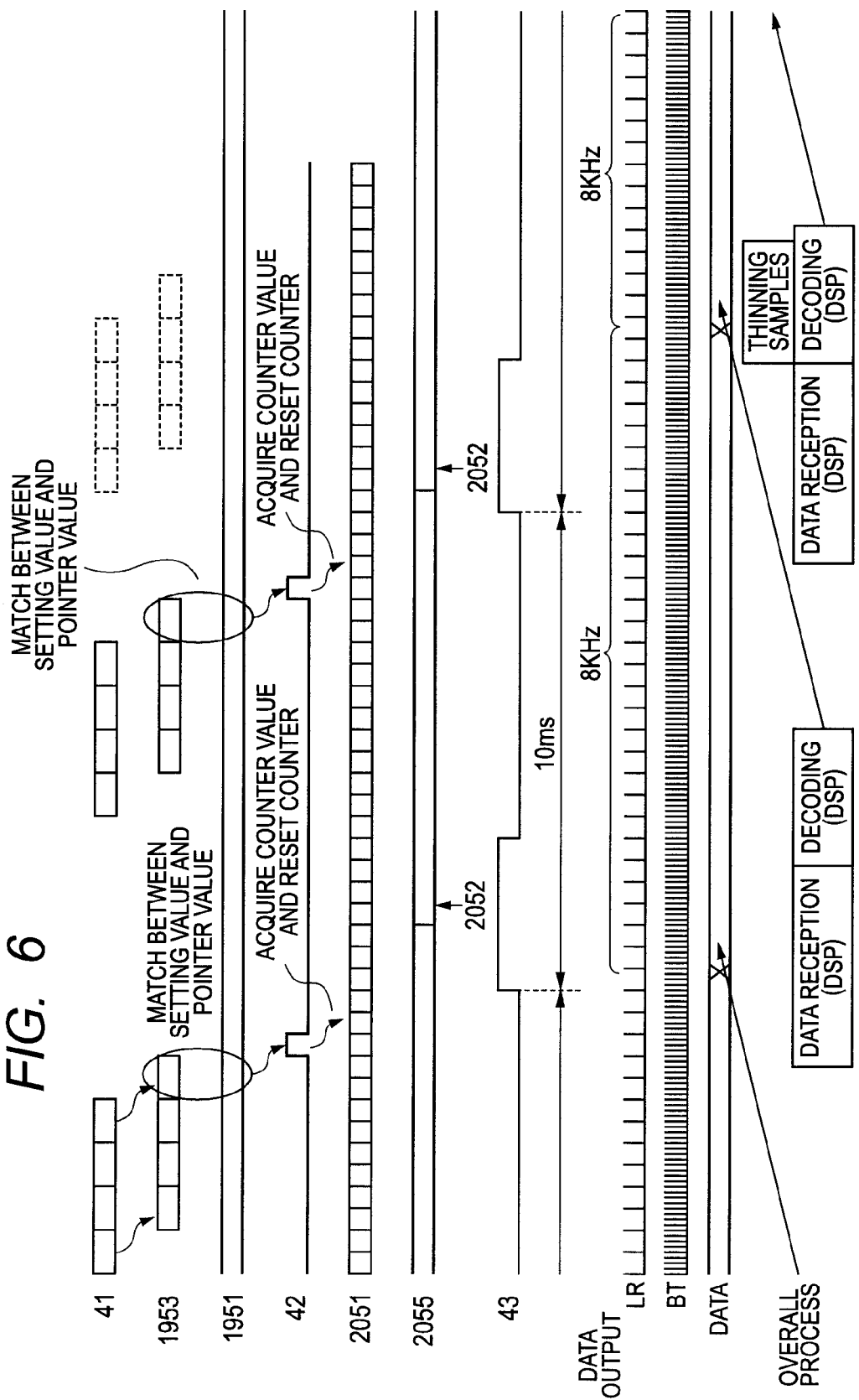
FIG. 6 is yet another operation timing chart for major components of the microcomputer shown in FIG. 1.

FIG. 6 shows operation timings when packets are received from the baseband LSI 23 through the terminal 29 at an interval greatly shorter than that shown in FIG. 3.

A handover process is performed if packets are received from the baseband LSI 23 through the terminal 29 at a greatly shortened interval and a count output value from the counter 2051 does not range between the upper and lower threshold values specified for the register 2052. The synchronizing signal (LR) remains 8 KHz even if packets are received from the baseband LSI 23 through the terminal 29 at a greatly shortened interval and the cycle of the network synchronizing signal 43 temporarily changes to 10 ms, for example. In this case, too many samples become available and are therefore thinned out during the decode process of the DSP 203. Thinning out the samples prevents the speaker 27 from generating unpleasant sound due to too many samples.

Figure 7:
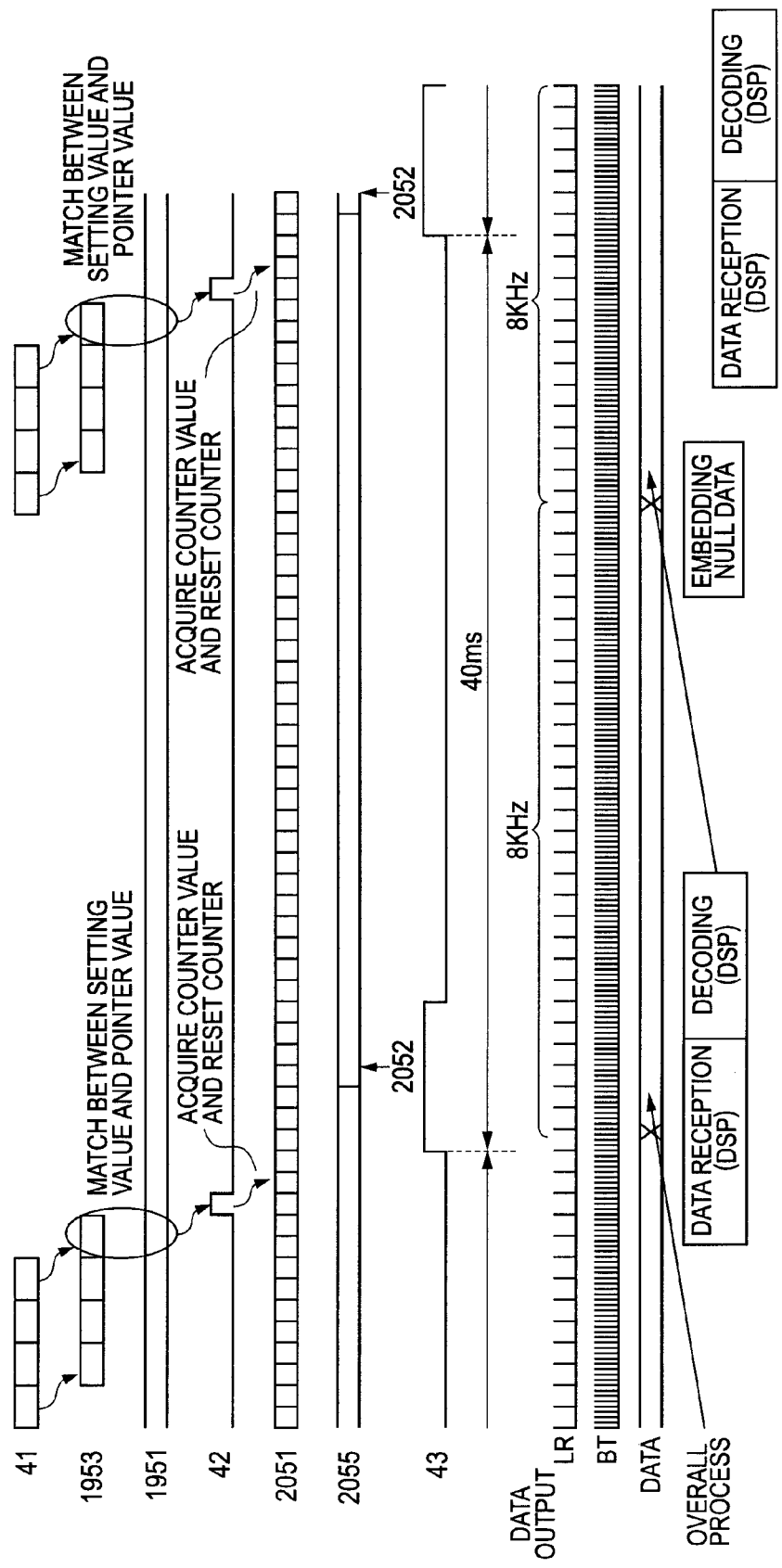
FIG. 7 is still yet another operation timing chart for major components of the microcomputer shown in FIG. 1.

FIG. 7 shows operation timings when packets are received from the baseband LSI 23 through the terminal 29 at an interval greatly longer than that shown in FIG. 3.

A handover process is performed if packets are received from the baseband LSI 23 through the terminal 29 at a greatly extended interval and a count output value from the counter 2051 does not range between the upper and lower threshold values specified for the register 2052. The synchronizing signal (LR) remains 8 KHz even if packets are received from the baseband LSI 23 through the terminal 29 at a greatly extended interval and the cycle of the network synchronizing signal 43 temporarily changes to 40 ms, for example. In this case, too few samples become available and silence data (null data) is embedded during the decode process of the DSP 203. Embedding silence data (null data) prevents the speaker 27 from generating unpleasant sound due to too few samples.

Second Embodiment

Figure 9:
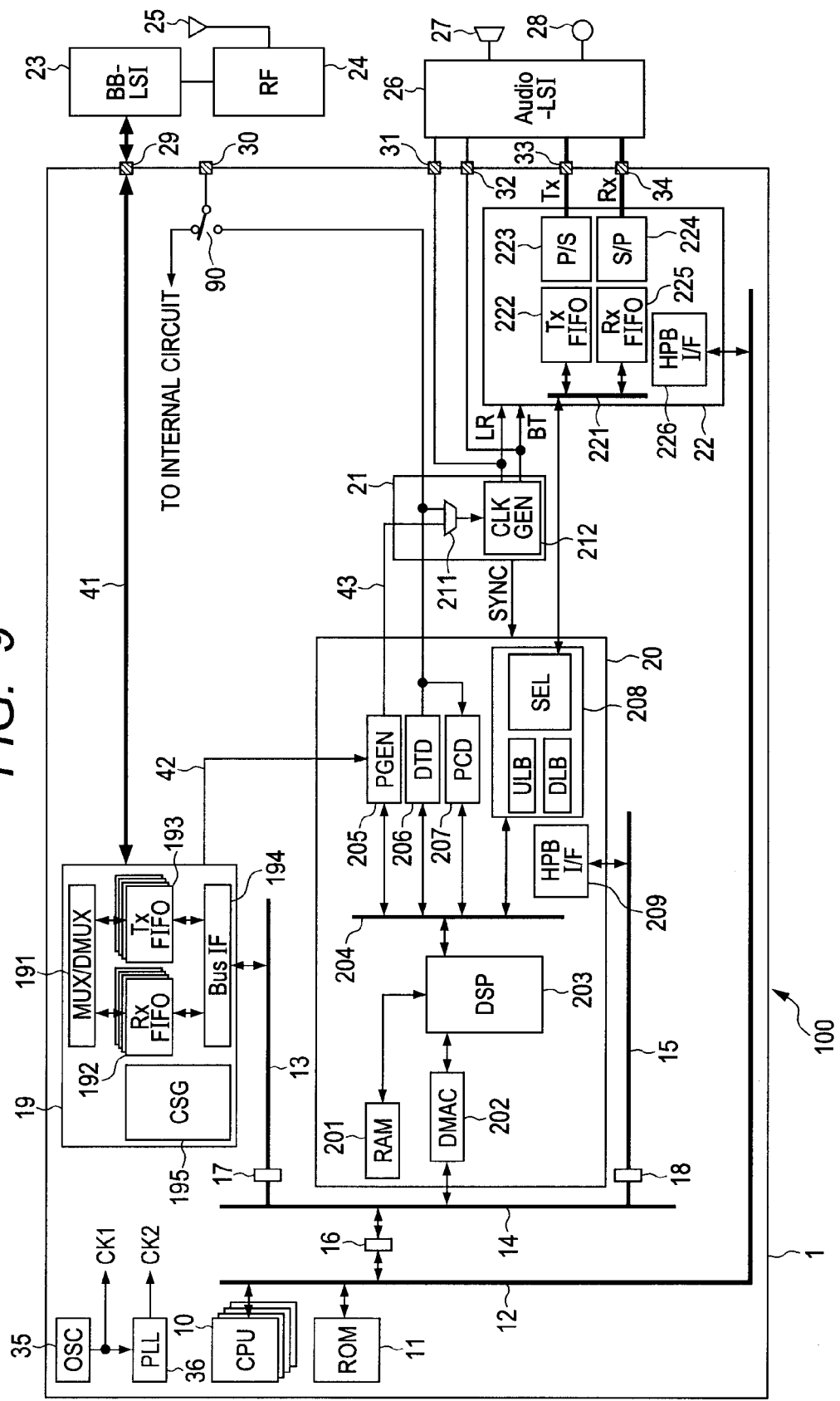
FIG. 9 is a block diagram showing another configuration example of a mobile terminal having a microcomputer as an example of the information processing device according to the invention.

FIG. 9 shows another configuration example of a mobile terminal having a microcomputer as an example of the information processing device according to the invention.

The mobile terminal 100 shown in FIG. 9 mainly differs from the example in FIG. 1 in that the mobile terminal 100 in FIG. 9 is provided with a switch 90 capable of changing a coupling destination of the terminal 30. Settings in a register (not shown) can change the state of the switch 90. The central processing unit 10 can control settings in this register. When the baseband LSI 23 inputs a network synchronizing signal through the terminal 30, the switch 90 couples the terminal 30 to the clock generator 21. When the baseband LSI 23 does not input a network synchronizing signal through the terminal 30, the switch 90 couples the terminal 30 to an input/output portion of an internal circuit (not shown). The terminal 30 can be used as an input/output port of the internal circuit.

Third Embodiment

Figure 10:
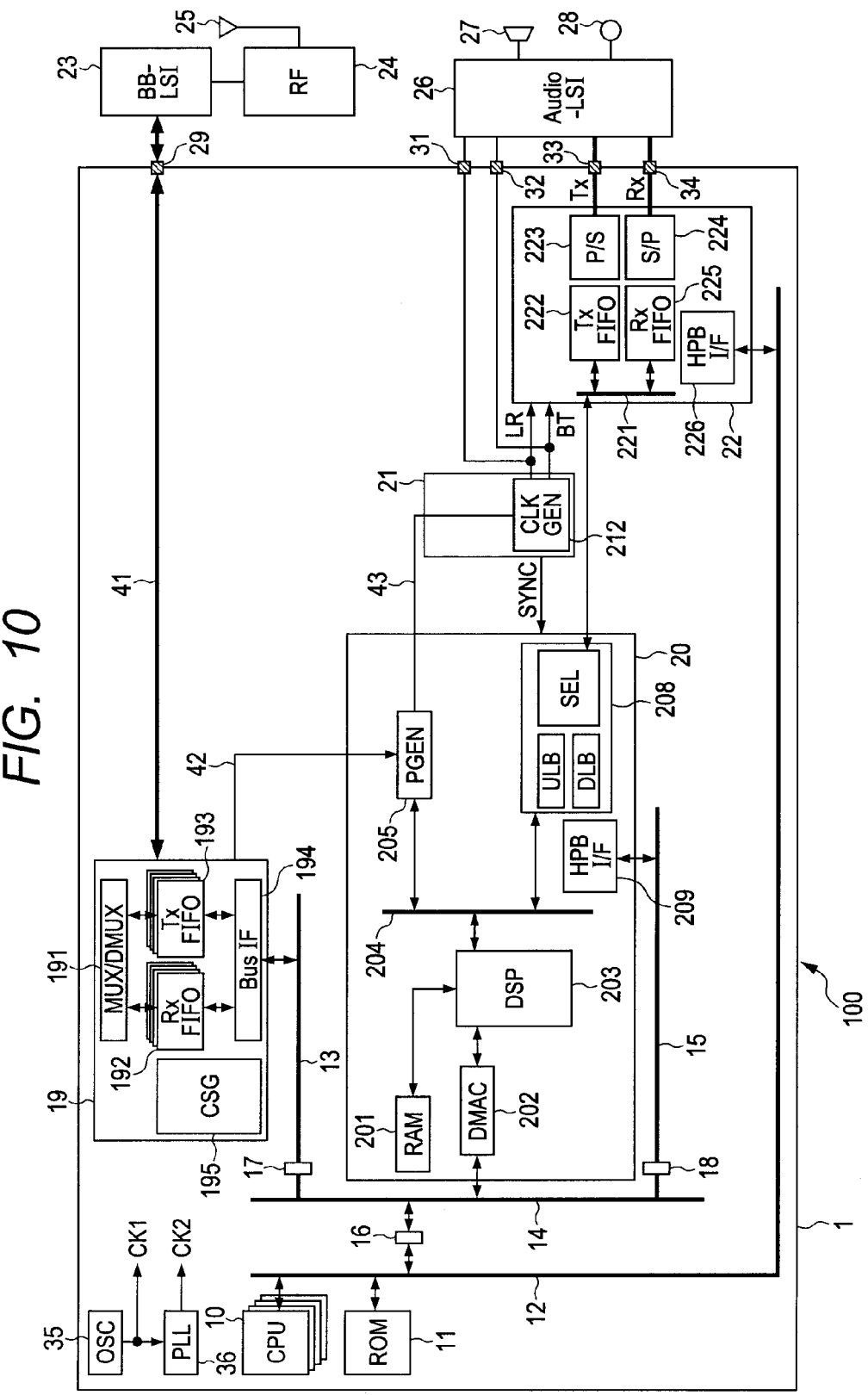
FIG. 10 is a block diagram showing still another configuration example of a mobile terminal having a microcomputer as an example of the information processing device according to the invention.

FIG. 10 shows still another configuration example of a mobile terminal having a microcomputer as an example of the information processing device according to the invention.

The mobile terminal 100 shown in FIG. 10 mainly differs from the example in FIG. 1 in that the terminal 30 in FIG. 1 is omitted. The terminal 30 may be omissible if there is no need to input a network synchronizing signal from the baseband LSI 23 through the terminal 30. The selector 21, the DSP control portion 206, and the pulse detection portion 207 in FIG. 1 are also unneeded as well as the terminal 30 if there is no need to input a network synchronizing signal from the baseband LSI 23 through the terminal 30. It is possible to decrease the number of terminals and reduce the circuit scale.

While there have been described specific preferred embodiments of the present invention, it is to be distinctly understood that the present invention is not limited thereto but may be otherwise variously embodied within the spirit and scope of the invention.

What is claimed is:

1. An information processing device comprising:
a first terminal capable of coupling with a baseband processing portion;
a second terminal capable of coupling with an audio processing portion;
a first serial interface capable of exchanging compressed data with the baseband processing portion coupled through the first terminal;
a speech processing portion capable of processing a speech signal incorporated by the first serial interface;
a clock generator that generates a clock signal for PCM communication; and
a second serial interface that uses a clock signal generated from the clock generator to enable PCM communication between the audio processing portion coupled through the second terminal and the speech processing portion,
wherein the first serial interface includes a notification signal generation circuit that generates a notification signal each time compressed data incorporated from the baseband processing portion reaches a predetermined data quantity, and notifies the speech processing portion of this state using the notification signal,
wherein the speech processing portion includes a synchronizing signal generation circuit that generates a network synchronizing signal based on the notification signal, and
wherein the clock generator generates the clock signal for PCM communication based on the network synchronizing signal generated from the synchronizing signal generation circuit.

2. The information processing device according to claim 1, wherein the first serial interface includes:
a buffer capable of outputting an incorporated signal based on a first-in first-out method; and
a pointer indicating a write position in the buffer, and
wherein the notification signal generation circuit includes:
a first threshold value register capable of setting a specified threshold value; and a first comparator that asserts the notification signal when a write position indicated by the pointer reaches a setting value in the first threshold value register.

3. The information processing device according to claim 2, wherein the synchronizing signal generation circuit includes:
a counter that counts a specified clock signal and is reset by the notification signal;
a second threshold value register capable of setting an upper limit and a lower limit;
a second comparator that determines whether a count value of the counter ranges between the upper limit and the lower limit of the second threshold value register;
a pulse information register that is supplied with pulse information based on a determination result from the second comparator; and
a pulse generator logic that generates, the network synchronizing signal at a frequency corresponding to a setting value for the pulse information register.

4. The information processing device according to claim 3, wherein the speech processing portion includes a signal processing circuit that thins out a sample or embeds silence data when a count value in the counter does not range between an upper limit and a lower limit of the second threshold value register.

5. The information processing device according to claim 4, wherein the clock generator includes:
a selector that can select the network synchronizing signal output from the pulse generator logic and a synchronizing signal output from the baseband processing portion; and
a clock generation circuit that generates synchronizing signal used for speech signal communication based on an output from the selector.

6. The information processing device according to claim 5,
wherein the first terminal includes a third terminal for incorporating the synchronizing signal from the baseband processing portion; and
wherein the information processing device includes a switch capable of coupling the third terminal to a circuit other than the clock generator when the synchronizing signal is not incorporated from the baseband processing portion through the third terminal.

7. A mobile terminal comprising:
the information processing device according to claim 5;
a baseband processing portion coupled to the information processing device; and
an audio processing portion coupled to the information processing device.

* * * * *